United States Patent [19]
Cordaro

[11] Patent Number: 5,820,669
[45] Date of Patent: Oct. 13, 1998

[54] (ZINC,CADMIUM) ALUMINATE-GALLATE-CONTAINING PAINTS

[75] Inventor: James F. Cordaro, Houghton, Mich.

[73] Assignee: Hughes Electronics Corporation, Los Angeles, Calif.

[21] Appl. No.: 819,750

[22] Filed: Mar. 18, 1997

[51] Int. Cl.[6] ........................................... C09C 1/04
[52] U.S. Cl. .................. 106/635; 106/426; 252/62.32 T
[58] Field of Search ..................... 106/419, 425, 106/426, 635; 252/508, 62.32 T

[56] References Cited

U.S. PATENT DOCUMENTS

| | | | |
|---|---|---|---|
| 4,111,851 | 9/1978 | Shai | 106/635 |
| 5,094,693 | 3/1992 | Cordaro et al. | 106/425 |
| 5,589,274 | 12/1996 | Long et al. | |

OTHER PUBLICATIONS

E.F. Riebling, "Growth of Zinc Aluminate & Gallate Spinels in Molten Bismuth Germanate Glasses", *Mat. Res. Bull.*, vol. 10, pp. 895–902 (1975).

L.E. Shea et al., "Low Voltage Cathodoluminescence of $Mn^{2+}$–Activated $ZnGa_2O_4$," *J. Electrochem. Soc.*, vol. 141, pp. 2198–2200 (1994).

Shigeo Itoh et al., "The $ZnGa_2O_4$ Phosphor for Low–Voltage Blue Cathodoluminescence," *J. Electrochem. Soc.*, vol. 138, pp. 1509–1512 (1991).

Naoyuki Ueda et al., "New oxide phase with wide band gap and high electroconductivity $MgIn_2O_4$," *Appl. Phys. Lett*, vol. 61(16), pp. 1954–19655 (1992).

Takahisa Omata et al., "New ultraviolet–transport electroconductive oxide, $ZnGa_2O_4$ spinel," *Appl. Phys. Lett.*, vol. 64(9), pp. 1077–1078 (1994).

Takahisa Omata, "New oxide phase with wide band gap and high electroconductivity $CdGa_2O_4$ spinel," *Appl. Phys. Lett.*, vol. 92(5), pp. 499–500 (1993).

*Primary Examiner*—Paul Marcantoni
*Attorney, Agent, or Firm*—Elizabeth E. Leitereg; Terje Gudmestad; Micahel W. Sales

[57] ABSTRACT

A paint is a liquid or solid mixture of a plurality of particles and an inorganic binder such as a silicate. The particles have a composition $A[xAl(1-x)Ga]_2O_4(\delta In)$, wherein A is zinc or cadmium, the value of x is from 0 to 1, and the value of $\delta$ is from 0 to about 0.2. In the liquid mixture, a paint vehicle is also typically present to impart the desired fluidity to the mixture. The solid paint made using this material is white, has very low solar absorptance, and may be made electrically conductive by doping the particles with indium or other appropriate dopant.

25 Claims, 4 Drawing Sheets

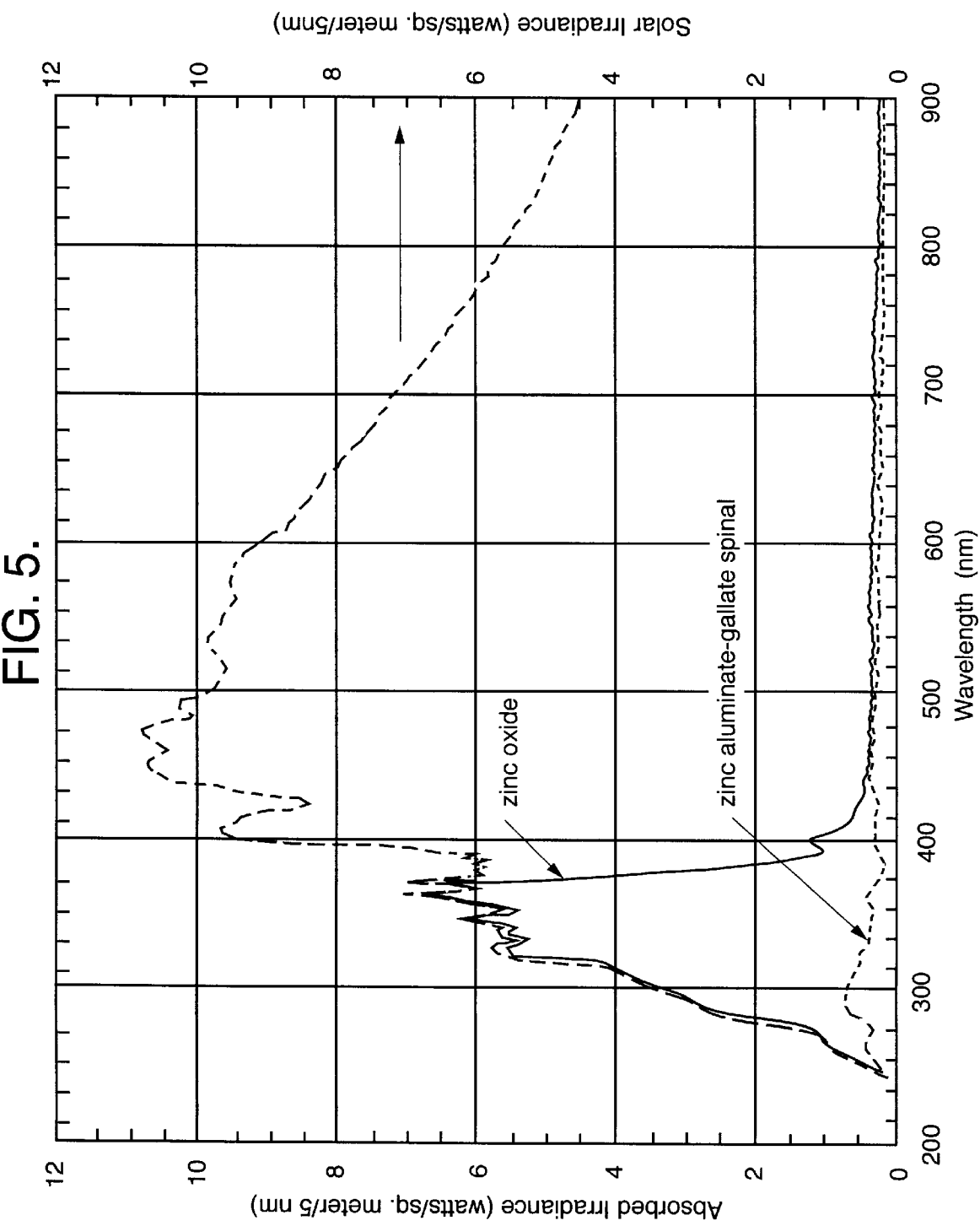

(ZINC,CADMIUM) ALUMINATE-GALLATE-CONTAINING PAINTS

BACKGROUND OF THE INVENTION

This invention relates to thermal control paints, and, more particularly, to a white paint useful in spacecraft applications.

Spacecraft are subjected to a wide range of thermal environments during service. One side of the spacecraft may face free space, while the other side faces the sun. Heat is radiated into free space to cool the spacecraft, but the spacecraft can be heated intensively in direct sunlight.

Active and passive temperature control techniques are used to maintain the interior temperature of the spacecraft, which contains persons or sensitive instruments, within acceptable operating limits. Active temperature control usually involves machinery or electrical devices, such as electrical heaters and heat pipes. The present invention deals with passive temperature control.

An established approach to passive temperature control is the use of surface coatings, typically termed "paints", on the external surface of the spacecraft. A white paint, for example, has a low solar absorptance, while a black paint has a high solar absorptance. The selective application of such paints to various elements of the spacecraft exterior greatly aids in controlling its temperature. The present invention deals with a white paint that is useful in spacecraft temperature control applications.

In most cases, the paint must dissipate electrostatic charges that develop on the external surface of the spacecraft, as well as provide passive thermal control. The charges would otherwise accumulate to cause arcing and possible damage to, or interference with, sensitive electronic equipment on or in the spacecraft. In order to dissipate electrostatic charge, the paint must be somewhat electrically conductive, with a surface resistivity on the order of about $10^9$ ohms per square or less.

A spacecraft paint, whatever its color, should exhibit additional characteristics for spacecraft applications. The paint should be stable during long-term service in a space environment. The paint is desirably moderately tough and flexible so that it does not crack and flake away as it is flexed due to mechanical or thermal strains.

There are white, electrostatic-dissipative paints known for spacecraft use. The best of the known paints using an inorganic potassium silicate binder typically has a solar absorptance of from about 0.13 to about 0.15, see U.S. Pat. No. 5,094,693, whose disclosure is incorporated by reference. No white, electrostatic-dissipative paints of lower solar absorptance are available. The lower the value of the solar absorptance, the lower the heating of the paint and thence the underlying substrate, in the intense heating of direct sunlight.

There is a need for an improved white thermal-control paint that is operable and stable in a space environment, which has a lower solar absorptance than available in existing paints, and which can manage electrostatic discharge (ESD). The present invention fulfills this need, and further provides related advantages.

SUMMARY OF THE INVENTION

The present invention provides a white, particulate-containing material usable in a paint. The particulate material is mixed with a binder and with a paint vehicle to form a liquid paint, which is then applied to a substrate and dried. The resulting paint has a lower solar absorptance than any other available paint suitable for spacecraft applications. The pigment and paint may be made in an electrically conductive form that dissipates electrostatic charge on the painted surface. The paint of the invention reaches the limit of optical performance for passive white thermal control paints.

In accordance with the invention, a paint comprises a mixture of pigment particles and an inorganic binder. Each particle has a composition of $A[xAl(1-x)Ga]_2O_4(\delta D)$, wherein A is selected from the group consisting of zinc and cadmium, D is a cationic dopant having an ionic valence greater than +2, the value of x is from 0 to 1, and the value of $\delta$ is from 0 to about 0.2. A is most preferably zinc. The dopant D, where present, is preferably indium, supplied as indium oxide.

The solid particle composition $A[xAl(1-x)Ga]_2O_4(\delta D)$ is a shorthand notation for a range of doped and undoped particle compositions extending between $AAl_2O_4$ and $AGa_2O_4$, which range includes the end points and the compositions therebetween. These undoped compositions, measured in an inorganic silicate paint binder, have solar absorptances $\alpha$ of less than 0.10, well below the solar absorptance available in any other paint suitable for spacecraft use. Varying the composition of the particle (by varying x) allows the index of refraction of the particle to be changed from a lower value when x is 1 to a higher value when x is 0. The index of refraction in part determines the "hiding power" or opacity of the paint. The ability to vary the index of refraction of the particle allows the selection of the hiding power according to the application.

Additionally, the composition may be doped with small amounts of cationic dopants D, such as indium (In), having a valence of greater than +2, which impart electrical conductivity to the composition. The notation ($\delta D$) as used herein indicates an addition of a small concentration $\delta$ of a dopant element D into the composition, usually as an oxide, and which substitutes for some of the zinc or cadmium in the spinel crystal structure.

The dopant D, when used, is normally provided in the form of an oxide. The particle composition may be equivalently expressed as $(A,\delta D)[xAl(1-x)Ga]_2O_{4+\gamma}$, wherein the value of x is from 0 to 1, the value of $\delta$ is less than about 0.2 (i.e., 20 atomic percent), and the value of $\gamma$ is less than about 0.2. This notation also emphasizes the fact that the dopant D, preferably indium, substitutes for zinc or cadmium atoms and preferentially resides on the zinc and/or cadmium lattice sites. The beneficial results are not achieved if the dopant D of +3 valence, such as indium or other elements of similar size, resides on the aluminum or gallium lattice sites. However, beneficial results may also be achieved if a dopant resides on the (Zn,Cd), Al , or Ga sites when the dopant has a +4 valence or greater, as, for example, in the case of $Ti^{+4}$, which may reside on the Al and/or Ga sites. The quantity $\gamma$ indicates additional small amounts of oxygen that may be added to the composition with the dopant D, as when indium is added as indium oxide. This small addition of oxygen does not adversely affect the operability of the invention, and may be beneficial in reducing the tendency for formation of color centers in the material.

The particle compositions $A[xAl(1-x)Ga]_2O_4$ have a normal (as distinct from inverse) spinel crystal structure, whether undoped or doped with the small amount of the dopant D. Within the range covered by this formulation, the indicated elements may be varied or minor amounts of other elements may be substituted for the indicated elements in a substitutional solid solution. For example, when the dopant indium is added in the form of indium oxide, the oxygen content increases a small amount above the nominal O=4 value, which is acceptable as long as the structure remains a spinel or spinel solid solution. In another example, a solute element may be substituted for the zinc, aluminum, or gallium, as long as the composition remains a single-phase, normal spinel crystal structure. That is, subject to the indicated constraints, small solid-solution variations away from the indicated nominal composition $A[xAl(1-x)Ga]_2O_4(\delta D)$ are within the scope of the invention.

The solid particulate material may be mixed with an inorganic binder such as an inorganic silicate, initially in a flowable liquid composition but subsequently in a solid composition after curing and/or drying. The binder binds the particles together into a coherent mass, as for a paint bonded to the surface of a substrate article. For use as a paint, the particulate and binder are initially mixed with a liquid paint vehicle, which serves to allow the mixing and applying of the paint to the substrate and thereafter dries and evaporates to leave the paint coating mixture of particles and binder adhered to the substrate.

The present invention provides an important advance in the art of thermal-control paints, films, and other articles. The pigment used in the paint is white and has a very low solar absorptance. It may be made either as an electrical insulator or as an electrical conductor with sufficiently low electrical resistivity to dissipate electrostatic charges. The paint prepared with inorganic binders is easily applied and is very smooth after drying. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a graph of the solar energy absorption by ZnO powder and by $ZnAlGaO_4$ powder.

DETAILED DESCRIPTION OF THE INVENTION

Figure 1:
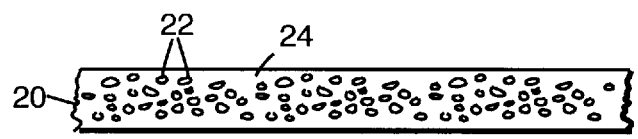
FIG. 1 is a side elevational view of a paint layer according to the invention.

FIG. 1 illustrates a paint layer 20 prepared according to the invention. The paint layer 20 comprises particles 22 mixed with a binder 24. (The particles are also sometimes referred to as a "pigment".) Prior to drying, a paint vehicle is also present, but the paint vehicle is evaporated during the drying operation. The composition of the particles, the binder, and the paint vehicle, their proportions, and the preparation of the paint layer will be described in greater detail subsequently.

Figure 2:
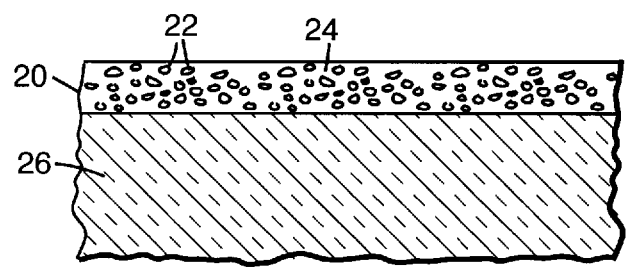
FIG. 2 is a side elevational view of the paint layer of FIG. 1, as applied to a substrate.

FIG. 2 illustrates the paint layer 20 applied to a substrate 26.

Figure 3:
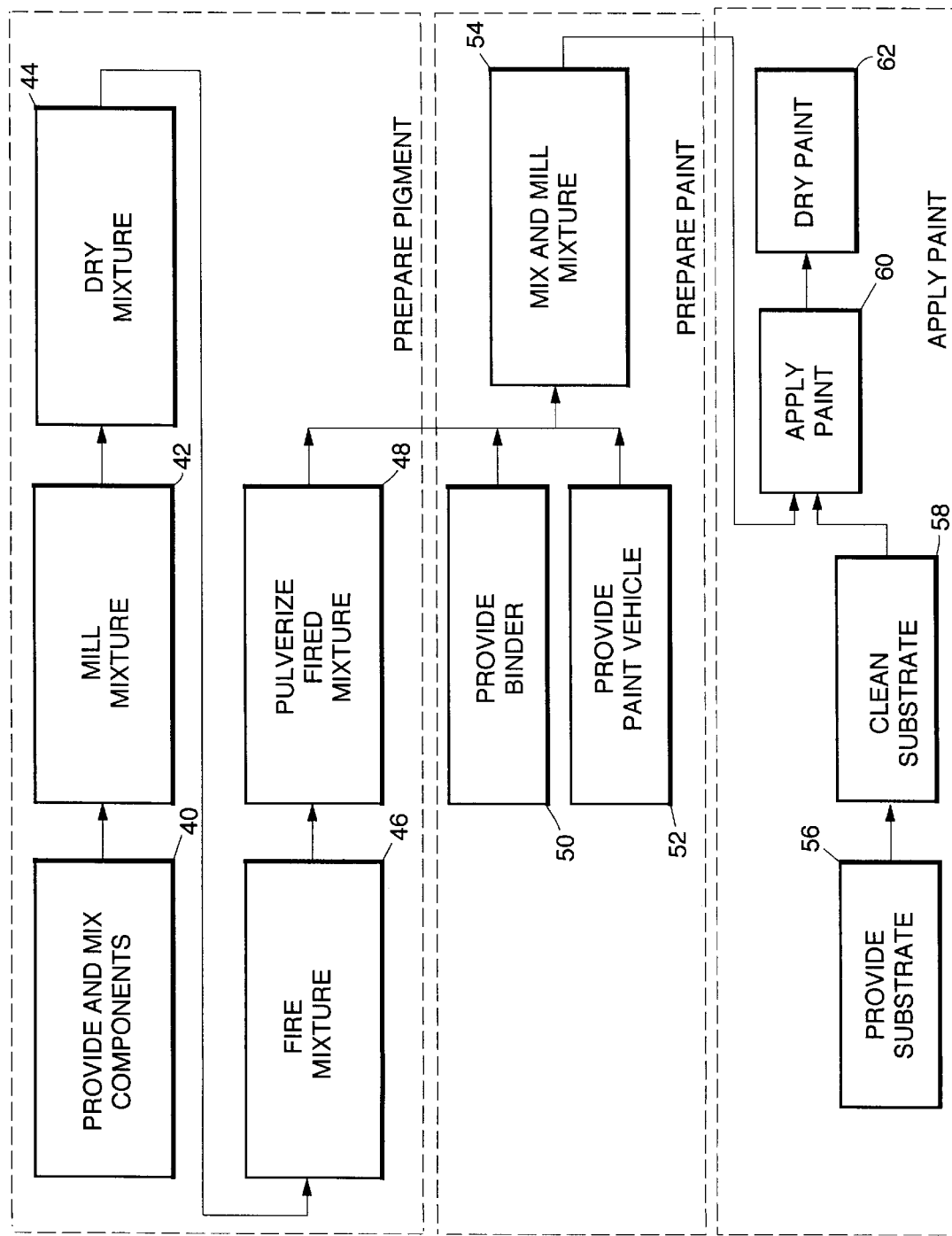
FIG. 3 is a block diagram of a method for the preparation of a white paint according to the invention and the painting of a substrate.

FIG. 3 depicts a preferred method for preparing the particles 22, for preparing the paint material used in the paint layer 20, and for painting the substrate.

To prepare the pigment or particles 22, the components are provided and mixed together, numeral 40. In the most general form, the particles have a composition stated by $A[xAl(1-x)Ga]_2O_4(\delta D)$, wherein A is zinc or cadmium, D is a cationic dopant having an ionic valence greater than +2, the value of x is from 0 to 1, and the value of $\delta$ is from 0 to about 0.2 (i.e., 20 atomic percent). The dopant D, where present, is preferably indium, supplied as indium oxide. The composition of the particles is selected from this formulation, and may be any composition within this range.

Preferably, A is zinc, and the application of the invention will be discussed primarily in terms of this preferred embodiment. In this preferred embodiment, if x and $\delta$ are both 0, the composition is the undoped $ZnGa_2O_4$, a material termed a zinc gallate If x is 1 and $\delta$ is 0, the composition is the undoped $ZnAl_2O_4$, a material termed a zinc aluminate. If x is between 0 and 1, and $\delta$ is 0, the composition is the undoped $Zn[xAl(1-x)Ga]_2O_4$, a material termed a zinc aluminate-gallate. Indium-doped versions of all of these compositions may be made by making $\delta$ nonzero, but no greater than the maximum value of about 0.2 indicated above.

The compositions of the form $Zn[xAl(1-x)Ga]_2O_4(\delta D)$ are of the normal spinel crystal structure and are solid solutions based upon the end point compositions $ZnGa_2O_4$ and $ZnAl_2O_4$. In the normal spinel structure, generally notated as $AB_2O_4$, oxygen anions form a face-centered-cubic close packed structure, with the zinc atoms in the tetrahedral A sites and the aluminum and/or gallium atoms in the octrahedral B sites. This composition range is chosen because of the properties achieved. The compositions are white in color with very low solar absorptances. Zinc is selected as the A-site cation in the particle composition of the invention, rather than other cations such as magnesium, because the resulting structure has a large band gap and because the resulting structure may be doped with small amounts of indium or other dopants to make the composition sufficiently electrically conductive to permit dissipation of electrostatic charges on the surface of the spacecraft. The aluminum and gallium cations are selected as the B-site cations in the particle composition.

The zinc aluminates, zinc gallates, and zinc aluminate-gallates comprise a range of compositions of a very few known pure white normal spinels which can be doped to achieve electrical conductivity. Another, but less preferred, such normal spinel is of the form $Cd[xAl(1-x)Ga]_2O_4(\delta D)$, where x, $\delta$, and D are as discussed above, and this normal spinel is also within the scope of the invention. A number of other normal spinels have been evaluated and excluded from the present invention. All of the following normal spinels are not white, and instead are colored, rendering them unacceptable as particles in the low-solar absorptance white paint: $ZnFe_2O_4$, $CdFe_2O_4$, $ZnCr_2O_4$, $CdCr_2O_4$, $FeAl_2O_4$, $CoAl_2O_4$, $MnAl_2O_4$, and $NiAl_2O_4$. The normal spinel $MgAl_2O_4$ is white in color, but it cannot be readily doped to increase its electrical conductivity for electrostatic charge dissipation, because the magnesium cation is highly stable in the +2 ionization state.

Figure 4:
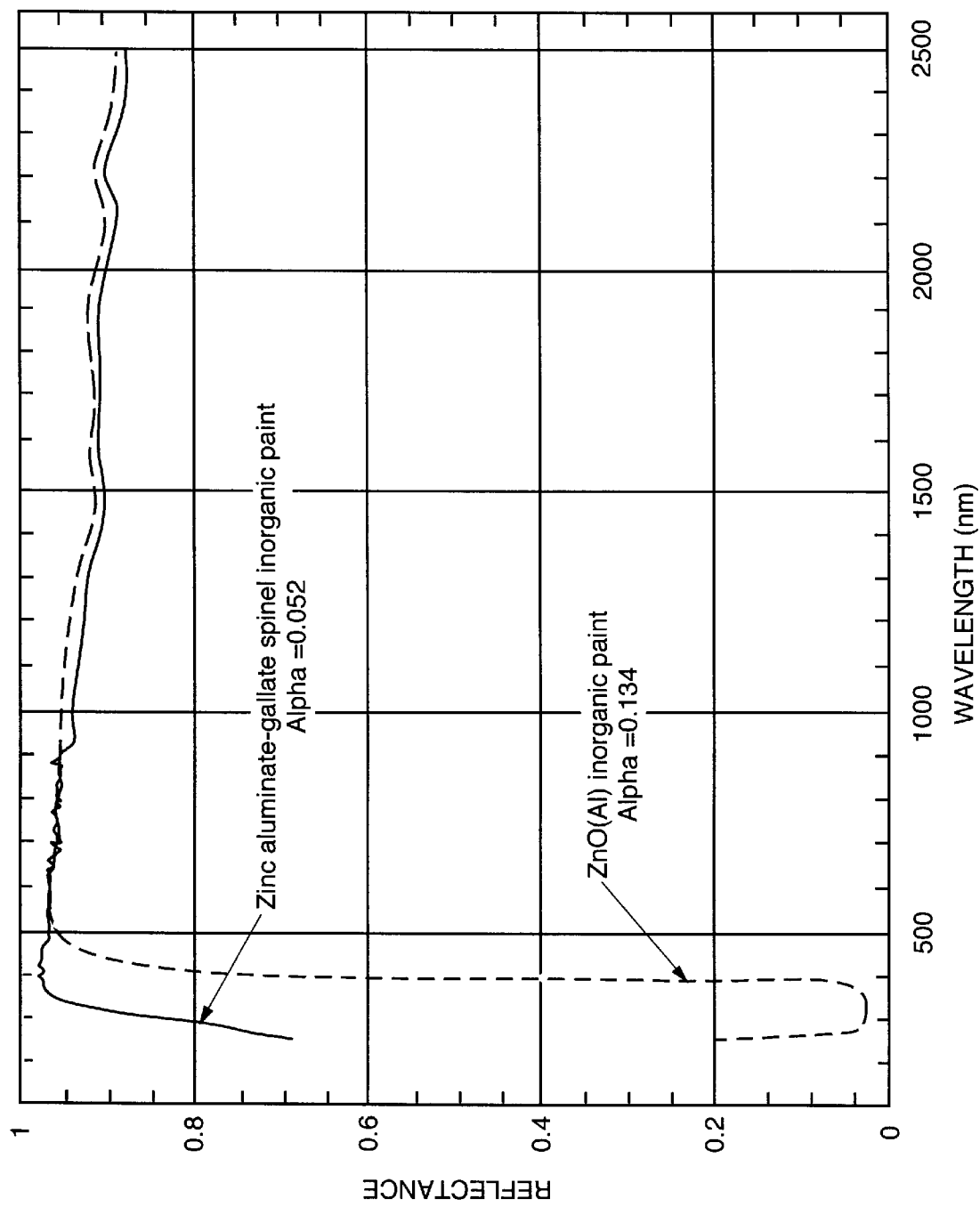
FIG. 4 is a graph of reflectance as a function of wavelength for a $ZnAlGaO_4$-based paint of the invention and for a ZnO(Al) paint of the '693 patent.

The $Zn[xAl(1-x)Ga]_2O_4(\delta D)$ compositions exhibit a lower solar absorptance over a wider wavelength range than do prior paint particles, as illustrated in FIG. 5. The energy band gaps of the $Zn[xAl(1-x)Ga]_2O_4(\delta D)$ normal spinels are greater than about 4.0 eV (electron volts). By comparison, the energy band gap of the ZnO wurtzite structure used in prior pigment formulations in U.S. Pat. No. 5,049,693 is about 3.2 eV. Consequently, the normal spinels of the invention reflect light with a very low solar absorptance much deeper into the ultraviolet range than do paints based upon ZnO pigments, such as described in U.S. Pat. No. 5,094,693. FIG. 4 presents a comparison of the reflectances of the ZnO-based paint of the '693 patent and zinc aluminate gallate normal spinel-based paint of the present invention as a function of wavelength, illustrating this point. The band gap of ZnO may be increased by doping with aluminum, gallium, or indium, but only very slightly. Increasing additions of aluminum and/or gallium to ZnO result in the transformation back to an insulating phase such as $ZnAl_2O_4$.

The undoped $Zn[xAl(1-x)Ga]_2O_4$ normal spinel compositions normally do not provide sufficient electrical conductivity to dissipate surface electrostatic charges that may be present on the surface of the painted substrate, because they are insulators. To increase the electrical conductivity (or, alternatively stated, reduce the electrical resistivity), the composition may be reduced in a hydrogen-containing atmosphere or doped with a semiconductor material. The reduction in a hydrogen-containing atmosphere is not preferred, because it produces color centers that color the material so that it is no longer white. If the composition is to be doped, it is doped with a cationic dopant having a valence of +2 or greater. Preferably, the doping is with indium to produce a composition $Zn[xAl(1-x)Ga]_2O_4(\delta In)$, where $\delta$ is less than 0.2 (i.e., 20 atomic percent). As used herein, the terminology ($\delta$In) means that the composition is doped with a small amount $\delta$ of indium.

The doping is preferably accomplished by adding indium oxide, which also adds an inconsequential amount of oxygen to the composition. The composition may then equivalently be expressed as $(Zn,\delta In)[xAl(1-x)Ga]_2O_{4+\gamma}$, emphasizing the fact that the indium substitutes for zinc atoms on the A-sites of the normal spinel structure. In this expression of the formulation, the $\gamma$ quantity, which is also about 0.2 or less, reflects the fact that for preferred formulations the indium is added as the oxide $In_2O_3$, and the oxygen in this compound adds a small increment to the oxygen content of the spinel. This small addition does not adversely affect the properties of the spinel and in fact may be beneficial by reducing the incidence of color centers in the particles. Indium is chosen as the dopant because the $In^{+3}$ ion in four-coordination with oxygen has a size of 76 picometers. The size of the $Zn^{+2}$ ion in four-coordination in the spinel is 74 picometers, nearly the same. The indium ion therefore preferentially substitutes for the zinc ion in the spinel. The presence of the +3 valence indium ion in place of some +2 valence zinc ions in the spinel structure forces the zinc to accommodate an extra electron in order to preserve charge neutrality, resulting in an electrically conductive, n-type semiconductor spinel. Other dopants D meeting the indicated limitations, such as $Ti^{+4}$ (having an ionic diameter of 74.5 picometers in six-coordination) may be used and provided as $TiO_2$, for substitution on the Al or Ga sites.

There may also be minor substitutions for the zinc, aluminum, and gallium cations in the formulation, as long as these substitutions result in a single phase, solid solution material having the normal spinel crystal structure. For example, cadmium may be substituted for a portion of the zinc, producing $(Zn,Cd)[xAl(1-x)Ga]_2O_4(\delta D)$.

The components of the particles are provided and mixed together, numeral 40. In the preferred formulation procedure, readily available components ZnO, $Al_2O_3$, $Ga_2O_3$, and $In_2O_3$ are used as starting materials. Thus, to prepare $ZAl_2)_4$, the appropriate amounts of ZnO and $Al_2)_3$ are mixed together. To prepare $ZnGa_2O_4$, the appropriate amounts of ZnO and $Ga_2O_3$ are mixed together. To prepare $Zn[xAl(1-x)Ga]_2O_4$, the appropriate amounts of ZnO, $Al_2O_3$, and $Ga_2O_3$ are mixed together. If any of these compositions is to be doped with indium, the appropriate amount of $In_2O_3$ is added to the mixture. A mixing medium, which later is removed, may be added to promote the mixing of the components. Preferably, water is used as the mixing medium.

The components and the mixing medium are milled together to form a mechanical mixture, numeral 42. After milling is complete, the mixing medium is removed by evaporation, numeral 44. The dried mixture is fired to chemically react the components together, numeral 46, at a temperature that is preferably in the range of from about 1000° C. to about 1300° C. A preferred firing treatment is 1160° C. for 6 hours, in air. After cooling, the agglomerated mass resulting from the firing is lightly pulverized, as with a mortar and pestle, numeral 48. The resulting particulate has a size range of from about 0.1 micrometer to about 5 micrometers. The preparation of the particulate pigment is complete.

The paint is prepared by providing the particulate material, prepared as described above or otherwise. A binder is provided, numeral 50, to adhere the particles together in the final product. The binder is selected to provide good adherence of the particles to each other and of the particles to the underlying substrate, with acceptable physical properties. The binder must withstand the environment to which the paint is exposed, such as a space environment. A preferred inorganic binder for space applications is potassium silicate. Inorganic sodium silicate may also be used. The binder is present in an operable amount. In a typical case, the binder is present in an amount such that the ratio, by weight, of the pigment to the binder is from about 3:1 to about 5:1. If the ratio is less than about 3:1, the resulting paint tends to be transparent after drying. If the ratio is more than about 5:1, the critical pigment volume concentration (CPVC) may be exceeded, the paint has insufficient mechanical strength, and the paint falls apart when dried.

The mixture of pigment and binder is ordinarily a solid, and a paint vehicle may be added to form a solution or a slurry that may be applied using conventional painting techniques, numeral 52. One preferred paint vehicle is water, which does not have adverse environmental impacts when later evaporated. Organic paint vehicles such as naphtha or xylene may also be used. The amount of the paint vehicle is selected to provide a consistency that will permit application of the paint by the desired approach. For example, application by spraying requires the use of more of the paint vehicle than application by brush or roller.

The paint may instead be applied by a technique where no vehicle is used, and in that case the step 52 is omitted.

The particles, binder, and paint vehicle are mixed together and milled together, numeral 54, to form a liquid paint formulation in which the particles do not rapidly separate. There may be some separation over extended periods of time, but the paint is normally stirred or agitated just before or at the time of application.

The preparation of the paint is complete.

Returning to FIG. 3, the paint is used by providing the substrate 26 to be coated, numeral 56, and cleaning the substrate, numeral 58. There is no known limitation on the type of substrate. The surface of the substrate is cleaned by any operable technique, such as washing and scouring in a detergent solution, rinsing in tap water, rinsing in de-ionized water, and drying in air.

The paint is applied to the surface of the substrate, numeral 60. At the outset of the application, the surface of the substrate may be primed to improve the adhesion of the paint. Priming is preferred for application of the paint containing an inorganic binder to metallic surfaces such as aluminum. Preferably, the priming, if used, is accomplished by rubbing a small amount of the paint into the surface using a clean cloth, to achieve good contact to the surface.

The paint layer is thereafter applied by any operable technique, with spraying being preferred. As indicated earlier, the amount of paint vehicle present in the paint is selected to permit application by the preferred approach. At this point, the paint is a thin film of a liquid material. Tests with application of the paint prepared by the present approach have demonstrated that the paint layer is much smoother than achieved with prior approaches such as that of U.S. Pat. No. 5,094,693. This smoothness is particularly important when the paint is applied to an aircraft where skin drag must be minimized. It is also important for all applications in order to allow the surface to be readily cleaned.

The paint may also be applied by a plasma spray technique or the like wherein the mixture of pigment and binder is supplied to a heated region such as a plasma and directed toward the substrate. The plasma-heated mixture of pigment and binder strikes the substrate and solidifies thereon.

The paint is dried as necessary to leave a thin film of a solid material, numeral 62. Drying is preferably accomplished at ambient temperature with a 50 percent or greater humidity and for a time of 14 days. Drying removes the paint vehicle by evaporation. Additionally, the drying step may accomplish a degree of curing of any curable components, as where a curable inorganic binder is used. The paint layer is preferably from about 0.003 to about 0.006 inches thick.

The painting is complete.

The following is a specific example of the preparation of $ZnAlGaO_4$ pigment, preparation of paint, and painting according to the procedure discussed above in relation to FIG. 3. A mixture of 89.99 grams of ZnO powder, 56.37 grams of $Al_2O_3$ powder, and 103.64 grams of $Ga_2O_3$ powder was weighed and mixed. The powders were added to a Roalox™#0 jar mill containing a 50 percent charge of ½ inch cylindrical end-radius Burundum™ milling media. A milling aid of 600 milliliters of de-ionized water was added to the jar mill. The jar mill was sealed and the jar was rotated to mill the mixture for 12–24 hours, resulting in a homogeneous mixture. The slurried mixture was removed from the jar mill and placed into a pneumatically stirred container overnight, resulting in drying of the mixture. The resulting ceramic cake was lightly pulverized with a mortar and pestle. The pulverized material was fired in an oven in air at 1160° C. for 6 hours, producing the undoped $ZnAlGaO_4$ spinel material. The resulting ceramic cake was lightly pulverized in a mortar and pestle, resulting in the powder pigment material.

The pigment material was used to prepare a paint. A mixture of 4 parts by weight of the pigment material prepared as in the preceding paragraph, 1 part by weight of Kasil 2135 potassium silicate inorganic binder, and about 1 to about 3 parts by weight of de-ionized water paint vehicle was prepared. This amount of water as the paint vehicle was chosen to permit spray application of the paint, as described in the next paragraph, and may be varied as convenient. The mixture was added to a jar mill with a 50 percent charge of Burundum milling media. The mixture was milled overnight to form the liquid paint.

The paint was applied by first furnishing a substrate, in this case a sheet of aluminum alloy. For application of this paint having an inorganic binder, the sheet was mechanically cleaned with a pneumatic sander with a scouring pad attached and highly alkaline detergent in water. After scrubbing, the sheet was washed with tap water and then de-ionized water to remove the detergent residue. The de-ionized water was blown away with pre-purified nitrogen gas and the sheet dried in a stream of pre-purified dry nitrogen gas. The cleaned coupon was primed by rubbing a small amount of the paint into the surface using a clean cloth. Within five minutes after cleaning, the liquid paint formulation was applied by spraying. After the spraying was complete, the coupon was dried and cured in a closed container at room temperature and 50 percent or greater humidity, for a time of at least 14 days.

The procedure for preparing pigment and paint, and for painting, described in the preceding three paragraphs was repeated, except that about 0.1 weight percent of indium oxide was added to the mixture of powders. The result was a pigment having a composition $ZnAlGaO_4$ doped with about 0.1 weight percent $In_2O_3$. As discussed previously, the oxygen content of the compound was slightly greater than stoichiometric, but that is acceptable within the scope of the invention. The remainder of the procedures were as described above.

Tests have been performed of the optical performance of the paints made according to the invention and of prior paints. The paints of the present invention were prepared as described above. For a potassium silicate-binder paint using undoped $ZnAl_2O_4$ pigment of the invention, the solar absorptance $\alpha$ was measured as 0.058. For a potassium silicate-binder paint using 0.1-weight percent indium oxide-doped $ZnAl_2O_4$ pigment of the invention, the solar absorptance $\alpha$ was measured as 0.074. For a potassium silicate-binder paint using undoped $ZnAlGaO_4$ on an aluminum substrate, a was measured as 0.052. For comparison, a silicate-binder ZnO-based paint made according to U.S. Pat. No. 5,094,693 had an $\alpha$ of 0.13, over 2½ times higher. These differences in solar absorptance between the paints of the invention and the prior ZnO-base paints are highly significant. The paints of the invention achieve much lower solar absorptances than the prior art ZnO-based paints, so that structures painted with these paints experience far less heating than structures painted with the prior paints.

In another test, a current density of 0.5 nanoamperes per square centimeter of 10 keV (thousands of electron volts) electrons was sprayed onto the surface of a substrate painted with a paint based upon 0.1-weight percent indium oxide-doped $ZnAl_2O_4$ pigment of the invention, to simulate known spacecraft charging conditions. After charging, a voltage probe was scanned across the surface. Most surprisingly, no residual voltage was measured, indicating that the paint had sufficient electrical conductivity to prevent electrostatic discharge effects. This ability to avoid residual voltage entirely at the surface of a white thermal-control paint has not been previously observed, to the inventor's knowledge.

Specimens were successfully prepared of powder pigments of both stoichiometric and non-stoichiometric $ZnAl_2O_4$, of both stoichiometric and non-stoichiometric $ZnGa_2O_4$, and of $ZnAlGaO_4$ (x=0.5 in the general form representation of the composition presented earlier). X-ray measurements demonstrated that the formulation of these powders was successful in preparing the indicated spinel materials.

Although particular embodiments of the invention have been described in detail for purposes of illustration, various modifications and enhancements may be made without departing from the spirit and scope of the invention.

Accordingly, the invention is not to be limited except as by the appended claims.

What is claimed is:

1. A paint comprising
    a plurality of pigment particles, wherein each particle has a composition of $A[xAl(1-x)Ga]_2O_4(\delta D)$, A is selected from the group consisting of zinc and cadmium, D is a cationic dopant having an ionic valence greater than +2, the value of x is from 0 to 1, and the value of $\delta$ is from 0 to about 0.2; and
    an inorganic binder mixed with the particles to form a mixture.

2. The paint of claim 1, wherein A is Zn and x is 0, so that each particle has a composition of $ZnGa_2O_4(\delta D)$.

3. The paint of claim 2, wherein A is Zn, x is 0, and $\delta$ is 0, so that each particle has a composition of $ZnGa_2O_4$.

4. The paint of claim 1, wherein A is Zn and x is 1, so that each particle has a composition of $ZnAl_2O_4(\delta D)$.

5. The paint of claim 4, wherein A is Zn, x is 1, and $\delta$ is 0, so that each particle has a composition of $ZnAl_2O_4$.

6. The paint of claim 1, wherein A is Zn and $\delta$ is 0, so that each particle has a composition of $Zn[xAl(1-x)Ga]_2O_4$.

7. The paint of claim 1, wherein A is Cd, so that each particle has a composition of $Cd[xAl(1-x)Ga]_2O_4(\delta D)$.

8. The paint of claim 1, wherein A is Zn, so that each particle has a composition of $Zn[xAl(1-x)Ga]_2O_4(\delta D)$.

9. The paint of claim 1, wherein the binder is an inorganic silicate.

10. The paint of claim 1, wherein the mixture of binder and particles is a liquid.

11. The paint of claim 1, wherein the mixture of binder and particles is a solid.

12. The paint of claim 1, wherein the mixture of binder and particles is a solid layer in contact with a surface of a substrate.

13. The paint of claim 12, wherein the solid layer has a thickness of from about 0.003 to about 0.006 inches.

14. The paint of claim 1, wherein the ratio by weight of particles to binder is from about 3:1 to about 5:1.

15. The paint of claim 1, further including
    a liquid paint vehicle, the particles, the binder, and the paint vehicle being mixed together to form a liquid mixture.

16. The paint of claim 1, wherein each particle further comprises a solute element substituted for at least one of the elements selected from the group consisting of zinc, aluminum, and gallium.

17. The paint of claim 1, wherein the dopant D is indium.

18. A paint, comprising:
    a plurality of particles, wherein each particle has a composition comprising $Zn[xAl(1-x)Ga]_2O_4(\delta In)$, the value of x is from 0 to 1, and the value of $\delta$ is from 0 to about 0.2, and
    an inorganic binder mixed with the particles to form a mixture.

19. The paint of claim 18, wherein the binder is an inorganic silicate.

20. The paint of claim 18, wherein the binder is potassium silicate.

21. The paint of claim 18, wherein the ratio by weight of particles to binder is from about 3:1 to about 5:1.

22. The paint of claim 18, wherein the mixture of binder and particles is a liquid.

23. The paint of claim 18, wherein the mixture of binder and particles is a solid.

24. The paint of claim 18, wherein the mixture of binder and particles is a solid layer in contact with a surface of a substrate.

25. A paint, comprising:
    a plurality of particles, wherein each particle has a composition comprising $(Zn,\delta In)[xAl(1-x)Ga]_2O_{4+\gamma}$, the value of x is from 0 to 1, the value of $\delta$ is less than about 0.2, and the value of $\gamma$ is less than about 0.2, and
    an inorganic binder mixed with the particles to form a mixture.

* * * * *